Dec. 27, 1960 D. F. HYDE 2,966,175
MOTOR-DRIVEN SYRINGE
Filed July 14, 1958 2 Sheets-Sheet 1

Inventor
David F. Hyde
By Mann, Brown & McWilliams
Attorneys

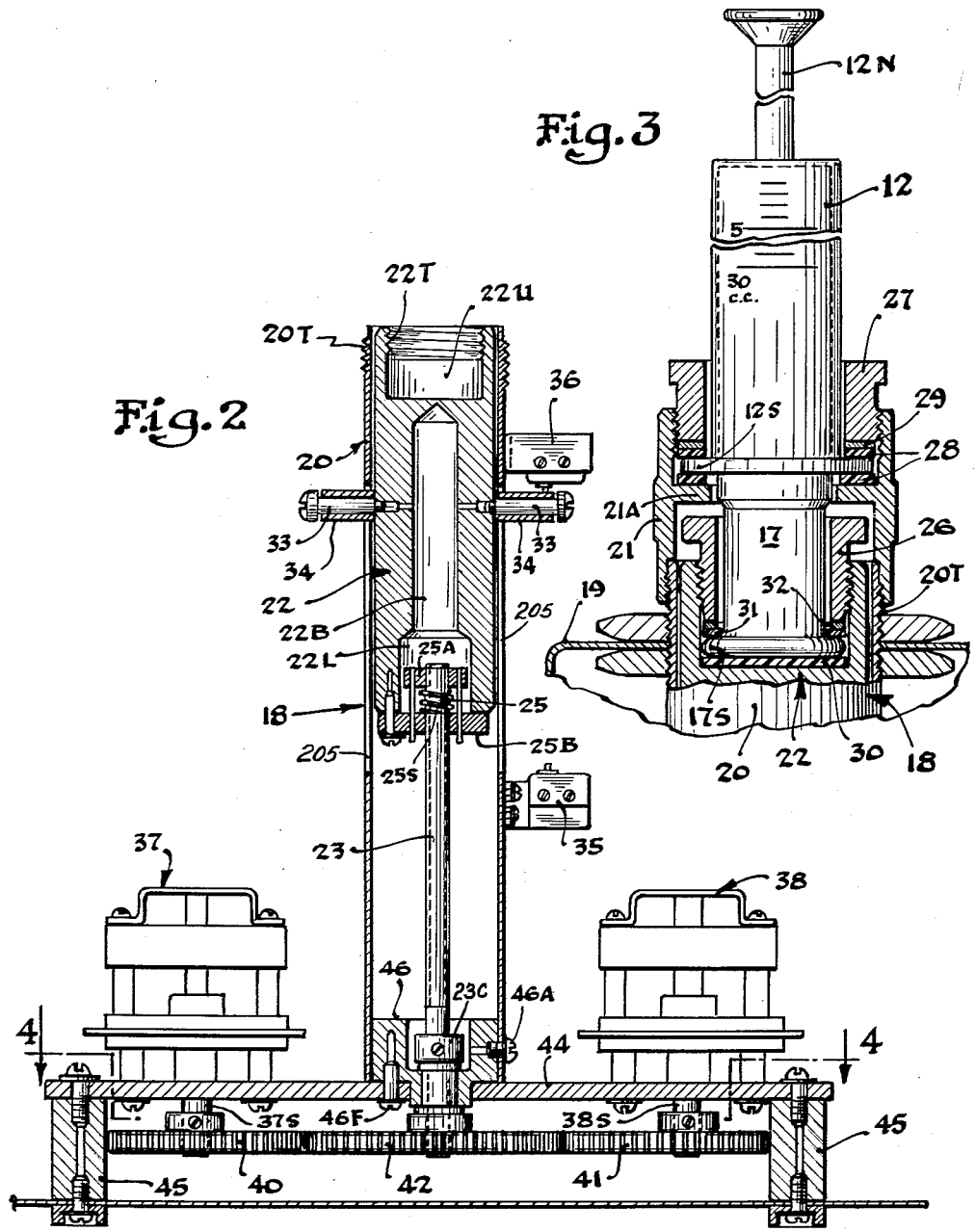

United States Patent Office 2,966,175
Patented Dec. 27, 1960

2,966,175

MOTOR-DRIVEN SYRINGE

David F. Hyde, Chicago, Ill., assignor to Central Scientific Company, Chicago, Ill., a corporation of Illinois Filed July 14, 1958, Ser. No. 748,233

15 Claims. (Cl. 141—27)

This invention relates to a motor-driven syringe for use in the accurate volumetric delivery of liquids and finds important application in titrations wherein unknown solutions are identified by accurately measuring the amount of liquid reagent that must be added to bring the unknown solution to a predetermined end point. More particularly, this invention is concerned with a motor-driven syringe wherein the volume of liquid delivered thereby is automatically controlled, measured and indicated in the form of a digital presentation.

In the past, reagent delivery in titrations has been carried out in a number of ways. Originally, hand-operated syringes and burets were employed. With the advent of automatic control for titrations, however, these manual devices became outmoded. Electrically controlled solenoid-operated burets were then used, but they have been found to be inaccurate and difficult to read. Even hand-operated syringes are more serviceable than automatically controlled burets. More recently, coulometric supply of reagent by electrolysis in situ has been promoted, but this technique is of limited versatility and may frequently require special mounting arrangements for the electrodes, depending on the type of end point detection equipment that is employed. Thus, there exists a real need for volumetric reagent delivery equipment that complements and derives full benefit from the advances which have been made in the associated end point detection and control equipment.

The principal object of the invention is to provide a highly accurate, reliable and versatile motor-driven syringe arrangement that will satisfy this need.

Other objects and advantages will become apparent during the course of the following description.

In the accompanying drawings forming a part of this specification and in which like numerals are employed to designate like parts throughout the same;

Fig. 2 is a detailed vertical sectional view through the motor-driven syringe unit of Fig. 1, with the syringe and portions of the outer casing omitted;

Fig. 3 is a fragmentary side-sectional view of the syringe-mounting arrangement;

Figure 1:
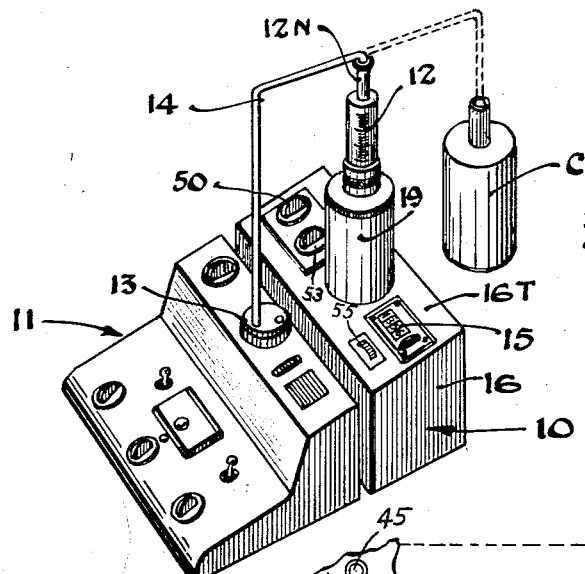
Fig. 1 is a diminutive perspective view of the motor-driven syringe unit of this invention in association with an automatic titration end point detector unit that includes means for automatically cutting off the supply of reagent from the syringe unit.

Referring now to the drawings and particularly to Fig. 1, the motor-driven syringe unit of this invention, as indicated at 10, is shown in operative association with a titration unit 11 that includes facilities for automatically detecting titration end points and correspondingly controlling an automatic cutoff device provided in the syringe unit for immediately terminating further delivery of reagent. The titration unit 11 preferably is of the type shown and described in copending application, Serial No. 748,234, filed July 14, 1958, in the names of Conrad M. Jankowski, Manning S. Reynolds, and James M. Thoburn. The disclosure of this application, to the extent it is not inconsistent herewith, is specifically incorporated by reference.

The motor-driven syringe unit includes a syringe barrel 12, of glass or other suitable material, that receives and stores a liquid reagent for measured volumetric delivery thereof to a sample cell 13 of the titration unit. As illustrated, the syringe barrel 12 is preferably arranged vertically and at its upper end includes a discharge nipple 12N in the form of an elongated tubular stem that is adapted for leak-tight connection to one end of a liquid-reagent delivery tube 14, the other end of which feeds directly into the sample cell. The delivery tube, as indicated in dotted lines in Fig. 1, is adapted for connection to a storage container C for the liquid reagent to draw reagent into the syringe barrel 12 for subsequent measured delivery to the sample cell.

In accordance with this invention, volumetric delivery of reagent from the syringe is registered on a counter 15 that is conveniently visible through the top panel 16T of the main housing 16 of the unit to provide a digital presentation representative of the volume of liquid delivered from the syringe.

The overall arrangement of operating parts of the motor-driven syringe unit is best shown in Figs. 2 and 3 wherein the syringe is shown as including a conventional piston 17 that is vertically reciprocable through the open bottom end of the barrel 12, with the piston and barrel being mounted in accurate, coaxial alignment at the upper end of an upstanding guide and support assembly 18 that projects through a cylindrical tower 19 that extends above the top panel 16T of the main housing for the unit.

The guide and support assembly includes a hollow outer column 20 threaded externally at its upper end 20T, a mounting nest 21 for the syringe barrel in threaded engagement with the upper end of the column 20, a mounting block 22 for the syringe piston 17 arranged in accurate, snug-fitting, non-rotatable, slidable relation in the column, and a rotatable drive rod 23 in the form of a precision screw that projects into a clearance bore 22B opening through the bottom end of the mounting block, with the drive rod being connected in threaded relation to the block so that rotation of the rod drives the block 22 through the column 20.

The mounting block 22 is in the form of a plunger and is axially recessed at its upper and lower ends to form mounting pockets 22U and 22L for the externally shouldered lower end 17S of the piston 17 and for a connection-nut assembly 25. The assembly 25 includes an antibacklash spring 25S reacting between spaced-apart nuts 25A and 25B that have direct threaded engagement with the drive rod 23, with the lower nut 25B being fixed to the lower end of the plunger 22. The recess at the upper end of the plunger is internally threaded, as indicated at 22T, and receives an externally threaded mounting nut 26 for anchoring the piston in predetermined alignment within the mounting block or plunger 22.

The mounting nest 21 for the syringe barrel is in the form of a collar that is internally threaded adjacent its opposite ends, with the lower end of the collar being threaded onto the upper end of the column 20 and with a barrel nut 27 being threaded into the upper end of the collar for securing the shouldered lower end 12S of the syringe barrel in fixed position relative to an internal abutment shoulder 21A located intermediately along the length of the collar 21. The bottom face of the abutment shoulder is flat and provides a solid stop that is engageable with the flat upper end face of the piston nut 26 for positively limiting over-travel of the piston through the barrel, thereby protecting the fragile syringe parts.

In a power-driven syringe arrangement, accurate alignment is crucial if excessively frequent breakage of the syringe barrel is to be avoided. Accordingly, the plunger 22 is in accurate, snug-fitting, slidable, contacting engagement with the interior of the column 20 to establish coaxial alignment; and the arrangement of the nest 21 and the mounting nuts 27 and 26 for securing the barrel and piston to the column and plunger maintains the established alignment.

To provide a cushioned and yet firm mount for the fragile glass barrel and piston, mounting rings 28 of a slightly yieldable material such as polytetrafluoroethylene, more commonly known under the trade name "Teflon," are provided on opposite sides of the barrel shoulder 12S, with a steel wear ring 29 located between the upper Teflon ring and the barrel nut 27. Similarly a disc 30 of Teflon provides a mounting pad for the bottom face of the piston and a Teflon mounting ring 31 and steel wear ring 32 are disposed between the upper face of the piston shoulder and the piston nut 26. This cushioned mounting arrangement accommodates a limited adjustment of the axial alignment of the piston and the barrel to permit true coaxial alignment of these parts. It will be noted that the syringe-mounting assembly utilizes a conventional syringe construction for which replacement parts are readily available.

As mentioned previously, the plunger, which is driven by rotation of the drive rod 23, is mounted in non-rotatable, sliding relation within the column 20. Preferably, the plunger is provided with oppositely extending radial arms 33 having rollers 34 suitably journalled thereon with the arms and rollers projecting through lengthwise extending slots 20S provided in the side walls of the column. The rollers are arranged for wheeled engagement with the lengthwise edges of the slots to minimize frictional resistance to axial movement of the plunger through the column while preventing rotation of the plunger. In addition, the roller 34 on the right-hand arm (see Fig. 2) serves as an actuator for limit switches 35 and 36 that are fixed to the column at axially spaced points thereon for controlling the limits of movement of the syringe piston 17.

The syringe is powered by selectively energizeable, oppositely acting motor units designated generally at 37 and 38 which, in the illustrated form of the invention, are connected to the driving rod 23 through a three-piece gear-train arrangement.

Figure 4:
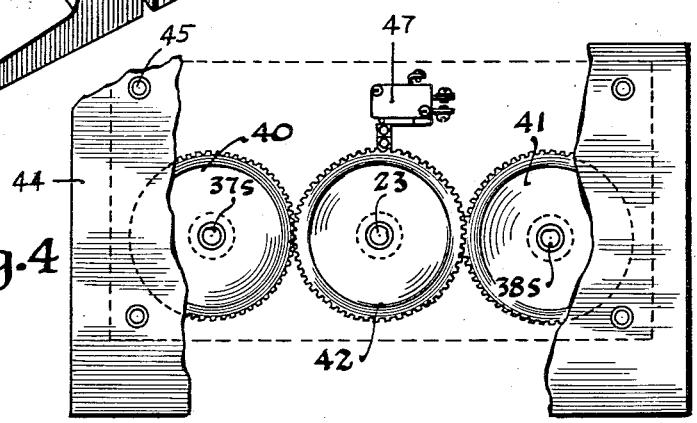
Fig. 4 is a plan view of the driving-gear arrangement at the base of the apparatus and is taken along the line 4—4 of Fig. 2.

The gear-train arrangement (see Figs. 2 and 4) comprises three coplanar, edgewise aligned spur gears, the outer or motor gears 40 and 41 of which are in direct connection with the output shafts 37S and 38S of the motor units and the central, or driven, gear 42 of which meshes with each of the outer gears and is in coaxial driving connection with the driving rod 23.

Each of the motor units may be of a type having a self-contained clutch mechanism between the motor and the associated output shaft, with the clutch mechanism being engaged only when the motor is energized.

In the illustrated arrangement, motor 37 is a fill motor and operates at a constant speed of 60 r.p.m. to drive the gear train in a direction to retract the syringe piston 17 at a convenient preselected speed, while motor 38 is a delivery motor and operates at a constant speed of 8 r.p.m. to advance the syringe piston at a considerably slower rate, which is desirable for accuracy in the control of the delivery operation.

A common base structure is provided for the various parts of the motor-driven syringe unit. The base structure comprises a base plate 44 and a plurality of support legs 45, with the base plate having a central opening through which a shouldered journal sleeve 46 projects, with the sleeve being fixed to the base plate by one or more fasteners 46F and disposed in snug relation within the bottom of the mounting column 20, with one or more additional fasteners 46A securing the mounting column to the sleeve. As is indicated, the motor units are supported above the base plate and have the output shafts thereof extended through the base plate for connection to the motor gears.

Intermediate structure that includes the sleeve 46 which anchors the mounting column 20 to the base plate 44 and a shouldered thrust collar 23C rigid on the rotatable drive rod 23 holds the column and rod against relative endwise movement.

The above described motor drive for the syringe offers significant cost advantages over comparable arrangements that depend upon a single motor that is reversible and has provisions for variable speed. In addition, the present arrangement is admirably suited for use in a commercial instrument where compactness and simplicity are so important.

Some of the important advantages of the unit of this invention are its versatility, convenience, and accuracy; and of these, accuracy is probably of first importance. In its normal use, the syringe will be called upon to deliver various amounts of reagent and will be turned on and off at appropriate times, either manually or automatically, with the main function of the syringe being to accurately measure and record the amount of reagent delivered.

According to this invention, an electric impulse type counter 15 is fixed to the underside of the top plate 16T of the main housing for convenience in viewing, and it preferably presents a digital representation of the volume of reagent supplied. The electric counter is controlled by a mechanically operated electric electric switch 47 having direct mechanical connection with the driving system for the syringe. In this disclosure, the electric switch is shown in engagement with the peripheral teeth of the driven spur gear 42 to open and close once for each tooth and count each tooth as it passes during a liquid-delivering rotating motion of this gear. Preferably, though not necessarily, the switch 47 is arranged so as not to respond when the driven gear is rotating in a liquid-filling sense. There is a particular advantage in this arrangement wherein the electric counter 15 is positioned for convenient viewing through the top panel of the housing and is controlled remotely by the switch 47, which is in direct engagement with the main part of the driving system in that the counting function imposes a minimal frictional drag upon the driving system for the syringe while avoiding errors due to cumulative backlash in a series of mechanical connections. Counting with this arrangement has proven to be highly accurate and repeatable in performance.

Figure 5:
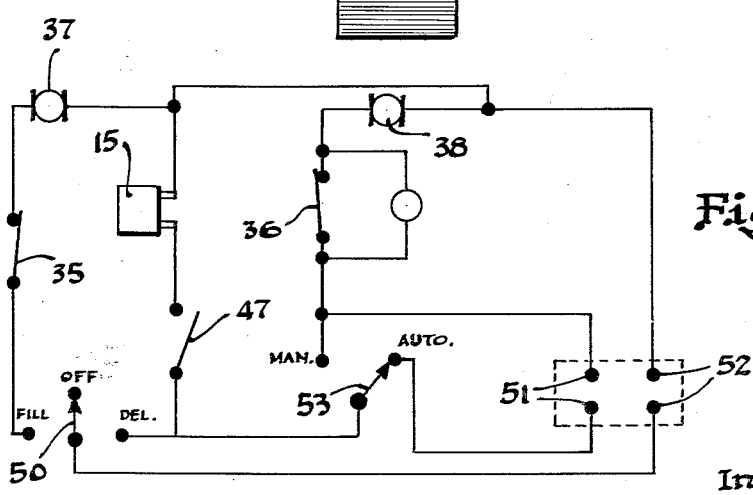
Fig. 5 is a diagrammatic illustration of the control circuit for the motor-driven syringe unit.

The operation of the motor-driven syringe unit will now be described in connection with its control circuit, which is illustrated diagrammatically in Fig. 5. Assuming the barrel of the syringe to be empty, a control switch 50 on the top panel 16T is turned to its "fill" position to energize the fill motor 37 through a circuit that includes the normally closed limit switch 35. When the fill motor is energized, its self-contained clutch mechanism immediately engages and connects the motor 37 to its output shaft 37S for driving the gear train to retract the plunger 22 and syringe piston 17. This action may continue until the roller 34 of the plunger engages the lower limit switch 35 to interrupt the energizing circuit for the fill motor.

The instrument is then ready for delivery of reagent and switch 50 is turned to the "deliver" position to pick up the delivery motor 38 through the normally closed limit switch 36, while simultaneously energizing the branch circuit for the counter 15. This phase of the operation may either be manual or automatic. In the case of automatic delivery, the terminals 51 of a plug-in receptacle receive a connection plug (not shown) from the end point detector unit 11, while in the case of manual control, the terminals 52 of the receptacle will receive a connection plug from a conventional source of A.C. power (not shown). In either case, the selector switch 53 will be appropriately positioned and this phase of the operation of the instrument is similar.

As the delivery motor 38 is energized, its clutch mechanism engages the output shaft 38S to drive the gear train for rotating the driving rod 23 so as to advance the plunger and syringe piston. As the driven spur gear 42 revolves, the counter switch opens and closes once during the passage of each tooth of this gear to register calibrated counts representative of the volume of reagent delivered.

In the case of automatic delivery, the supply of reagent is terminated when the circuit through the terminals 51 to the end point detector unit is interrupted by the apparatus of the end point detector unit. In the case of manual operation, the control switch must be actuated to terminate the supply.

It should be noted that the clutch mechanism immediately disengages to avoid the possibility of the momentum of the motor causing undesired over-travel of the driving system and of the syringe piston itself. Any such over-travel leads to serious inaccuracies. In this connection, it will be apparent that since the tube 14 may deliver liquid to the sample cell 13 at a point considerably beneath the liquid level of the syringe, a syphoning effect tending to cause over-travel of the piston may be developed. In the present arrangement, however, the piston nut 26 provides a releasable solid connection between the piston 17 and the driving system for resisting such syphoning forces.

Normally, the capacity of the syringe accommodates a number of titrations before refilling is required and the operator is given warning of the necessity for refilling by the normally closed limit switch 36, which opens upon engagement with the arm carried by the plunger. At that time, a warning light 55 on the top panel 16T is energized to inform the operator that the final titration exhausted the supply of reagent and did not reach an end point.

It should be understood that the description of the preferred form of the invention is for the purpose of complying with Section 112, Title 35, of the U.S. Code and that the claims should be construed as broadly as prior art will permit.

I claim:

1. In liquid-delivery apparatus, the combination with a syringe that includes an open-ended barrel and a piston reciprocably slidable through one end of the barrel to draw liquid into or eject liquid from the barrel, of support and guide means for said syringe and comprising a hollow mounting column, plunger means abutting one end of said piston and in non-rotatable, reciprocably slidable engagement within said column, drive means including a rotatable rod extending axially through said column into screw-threaded, relatively slidable engagement with said plunger means, intermediate structure securing said column and said rod against relative endwise movement, and a collar releasably securing said barrel to said column in endwise alignment therewith.

2. The apparatus of claim 1 wherein said piston has an external end shoulder, said plunger means has a recess at the end thereof adjacent said piston to form a mounting pocket for said shoulder coaxial with said barrel, and clamping means securing said shoulder within said pocket.

3. In liquid-delivery apparatus, the combination with a syringe that includes an open-ended barrel and a piston reciprocably slidable through one end of the barrel to draw liquid into or eject liquid from the barrel, of support and guide means comprising a hollow mounting column having side walls formed with lengthwise slots, plunger means abutting one end of said piston and in reciprocably slidable, non-rotatable engagement within said column, said plunger means having arms thereon provided with rollers projecting through said slots to provide frictionless, anti-rotation engagement between said plunger means and said column, drive means including a rotatable rod extending axially through said column into screw-threaded, relatively slidable engagement with said plunger means, intermediate structure securing said column and said rod against relative endwise movement, and a collar releasably securing said barrel to said column in endwise alignment therewith.

4. The arrangement of claim 3 wherein said drive means is an electric motor, and upper and lower limit switches are mounted at spaced points on said column for engagement by one of said arms for automatically shutting off said motor.

5. In liquid-delivery apparatus, the combination with a syringe that comprises a barrel having an open end provided with an annular external shoulder and a piston reciprocably slidable through the open end of the barrel and formed with an annular external shoulder, of support and guide means for said syringe comprising a hollow mounting column externally threaded at one end thereof, a sleeve-like nest having an internal abutment shoulder intermediately therein and internally threaded at opposite open ends thereof, said nest having one end thereof in threaded engagement with said column, with the shouldered end of said barrel being received in the other end of said nest and a barrel nut securing said barrel in said nest, a plunger in non-rotatable, reciprocably slidable engagement within said column, said plunger having an internally threaded mounting pocket at the end thereof adjacent the shouldered end of said piston, a piston nut securing the shouldered end of said piston in said pocket in coaxial alignment with said barrel, drive means including a rotatable rod extending axially through said column into screw-threaded, relatively slidable engagement with said plunger, and intermediate structure securing said column and said rod against relative endwise movement.

6. In liquid-delivery apparatus, the combination with a syringe that includes an open-ended barrel and a piston reciprocably slidable through the barrel to draw liquid into or eject liquid from the barrel, of a drive mechanism for reciprocating said piston and comprising a rotatable driven shaft, means connecting said shaft to said piston for moving said piston through said barrel in opposite directions in accordance with the direction of rotation of said shaft, and means for rotating said driven shaft and comprising first and second motor units having output shafts rotatable in opposite directions, motion-transmitting means connecting one of said motor units to said driven shaft for rotating the same in one direction, motion-transmitting means connecting the other of said motor units to said driven shaft for rotating the same in the opposite direction, and means for selectively driving one or the other of said motor units.

7. The arrangement of claim 6 wherein each of said motor units is an electric motor having a self-contained clutch between the motor and said output shaft thereof, with said clutch being automatically engaged and disengaged simultaneously with the energization and deenergization, respectively, of the motor.

8. The arrangement of claim 6 wherein the motor unit which controls forward or liquid-ejecting movement of the piston is a relatively slow-speed device and the other motor unit is a relatively fast-speed device.

9. The arrangement of claim 6 wherein the motion-transmitting means for connecting the motor units to the driven shaft comprises three coplanar, successively intermeshing spur gears, with said two output shafts and said driven shaft being fixed to separate ones of said gears.

10. The arrangement of claim 9 wherein an electric switch is mechanically connected to the spur gear that is fixed to said driven shaft to open and close once for each predetermined increment of rotation thereof in the piston-advancing direction and is connected in series with an electric-impulse counter for actuating the same.

11. An instrument for the volumetric delivery of liquid and comprising a housing, supporting structure within said housing and including a base plate and depending support legs therefor, a hollow column fixed to said plate with the axis of said column extending generally normal to the plane of said plate, a plunger in non-rotatable, reciprocably slidable engagement within said column, a rotatable driven rod journalled in said base plate and extending axially through said column into screw-threaded, driving engagement with said plunger, a pair of unidirectional motor units supported on said base plate in flanking relation to said column and having output shafts projecting downwardly through said base plate, said output shafts being rotatable in opposite directions, a separate spur gear fixed to each of said output shafts and to said driven shaft, with said spur gears being arranged beneath said base plate in coplanar, successive, intermeshing engagement, and means for selectively driving one or the other of said motor units.

12. In liquid-delivery apparatus, the combination with a syringe that includes an open-ended barrel and a piston reciprocably slidable through the barrel to draw liquid into or eject liquid from the barrel, of a drive mechanism for reciprocating said piston and comprising a rotatable driven shaft, means connecting said shaft to said piston for moving said piston through said barrel in opposite directions in accordance with the direction of rotation of said shaft, selectively operable motor means for rotating said driven shaft in one direction or the other, motion-transmitting means for connecting the motor means to the driven shaft and including a spur gear fixed to said driven shaft, an electric impulse counter, and an electric switch mechanically connected to the spur gear to open and close once for each predetermined increment of rotation thereof and connected in series with said counter for actuating the same.

13. In liquid-delivery apparatus, the combination with a syringe that includes an open-ended barrel and a piston reciprocably slidable through one end of the barrel to draw liquid into or eject liquid from the barrel, of support and guide means for said syringe and comprising a hollow mounting column, plunger means abutting one end of said piston and in non-rotatable, reciprocably slidable engagement within said column, drive means including a rotatable rod extending axially through said column, one end of said rod in screw-threaded, relatively slidable engagement with said plunger means, and the other end connected to a gear train, said gear train including a spur gear fixed to said rod, a driving motor having an output shaft in direct connection with the gear train, an electric impulse counter, and an electric switch mechanically connected to the spur gear to open and close once for each predetermined increment of rotation thereof in its piston-advancing direction and connected in series with said counter for actuating the same.

14. An apparatus for the syringe delivery of liquid comprising a syringe having a piston in an open-ended barrel, a syphon-creating supply tube communicating with said open-ended barrel for delivering liquid therethrough in response to movement therethrough of the liquid-ejecting piston, driving mechanism comprising a plunger for driving engagement with said piston, motor means for driving said plunger in the direction of movement of the piston, means for cutting off said motor means and manually releasable means for locking said plunger to said piston to anchor the piston to the driving mechanism to enable the driving mechanism to resist syphoning forces tending to cause over-travel of the piston following cut-off of the motor means.

15. In liquid-delivery apparatus, the combination with a syringe that includes an open-ended barrel and a piston reciprocably slidable through the barrel to draw liquid into or eject liquid from the barrel, of a drive mechanism for reciprocating said piston and comprising a rotatable driven shaft, means connecting said shaft to said piston for moving said piston through said barrel in opposite directions in accordance with the direction of rotation of said shaft, selectively operable motor means for rotating said driven shaft in one direction or the other, motion-transmitting means for connecting the motor means to the driven shaft, an electric impulse counter, and an electric switch mechanically connected to said drive mechanism to open and close once in response to each predetermined increment of rotation of said driven shaft and electrically connected to control actuation of said counter.

References Cited in the file of this patent

UNITED STATES PATENTS

| | | |
|---|---|---|
| 2,412,295 | Shaffer | Dec. 10, 1946 |
| 2,734,504 | Crescas et al. | Feb. 14, 1956 |